Patented Sept. 29, 1953

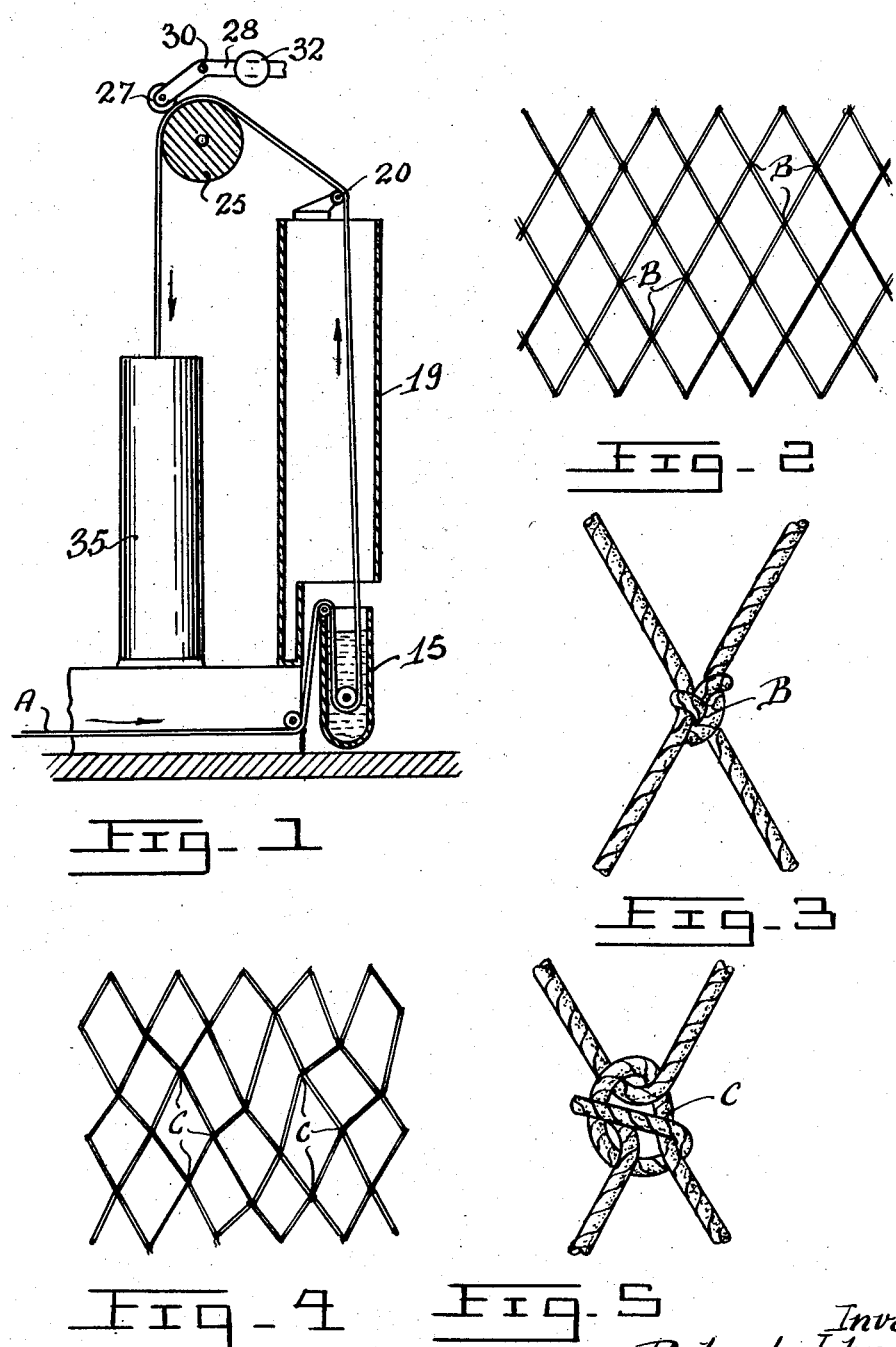

2,653,372

UNITED STATES PATENT OFFICE 2,653,372

NYLON FISH NETTING

Roland Johnson, Drummondville West, Quebec, and Robert W. Kolb, Drummondville, Quebec, Canada, assignors to Drummondville Cotton Company Limited, Montreal, Quebec, Canada, a corporation of Canada Application October 6, 1950, Serial No. 188,671
In Canada February 18, 1950

2 Claims. (Cl. 28—76)

Introduction

This invention relates to the manufacture of fish netting from nylon twine.

Nylon twine has many superior qualities for fish nets. Among these are its high strength and the fact that it does not tolerate bacteria which live on linen and cotton twine. But, nylon nets have one particular shortcoming in that they are normally subject to "slip-mesh." This is most undesirable since the mesh size is subject to change up to a point where the netting may be ineffective or useless.

One attempt, known to the applicants to overcome "slip-mesh," is to coat the netting with a resinous material. But, this is expensive both in the cost of the coating material used and also in the coating operation.

Applicants' development

The applicants have now developed a nylon netting which is characterized by the absence of "slip-mesh" and by the strands having a stretch substantially less than that of normal nylon twine. In accordance with the applicants' invention, the knots are "heat-set" into the shape they assume when knotted, without the necessity of using an extraneous coating material.

This knot can conveniently be set by a method, according to the invention, which includes the following steps. The netting is first knotted in the usual fashion on a netting loom forming single weaver's knots. Then the netting is immersed in a hot water bath at a temperature within the range from about 125° F. to about 200° F. for a period from about 5 seconds to about 60 seconds while being kept under a tension sufficient to maintain the form of the knot. The netting is removed from the bath and dried in air at a temperature from about 200° F. to about 300° F. sufficient to dry the netting in the time it is exposed to the drying region at normal production speeds. These operations are performed in a continuous process in which the netting is fed from the loom under tension, through the bath, and then through a drying space under tension, and when dried, into a can. The tension is preferably not greater than 10% of the breaking strength of the twine. The tension in drying may be the same as in wetting.

The invention will be further understood by reference to the accompanying drawings illustrating some of its preferred aspects, and in which:

Figure 1 is a diagrammatic illustration in side elevation of apparatus used in a preferred method of making netting in accordance with the invention.

Figures 2 and 3 are diagrammatic illustrations of netting, according to the invention, after use, demonstrating absence of "slip-knot."

Figures 4 and 5 are diagrammatic illustrations of conventional netting after use, showing the result of "slip-knot."

Detailed description

Referring more particularly to the drawings, the netting A is shown in Figure 1 moving through the process. The netting, after forming the netting by applying single weaver's knots to the twine in the conventional manner to form the net construction, the knots, as shown, being substantially evenly spaced apart and intervened by precise lengths of twine first passes through a wetting tank 15 which contains water at a suitable temperature, preferably within the range of about 125° F. to about 200° F. From the tank 15 the netting proceeds through a drying chamber 19 in which the air is at a suitable temperature, for example within the range from about 200° F. to about 250° F. The netting then passes over a guide roller 20, and a driven roller 25. The netting is held in contact with the roller 25 by a roller 27 mounted on a lever 28 pivoted as at 30 and counter-weighted as at 32. The netting is then deposited in a netting can 35. As shown and as mentioned above tension is kept on the netting from the time of knotting until the netting leaves the dry heating zone.

As a result of this treatment, the knots B in the netting retain their form as indicated in Figure 3, that is to say, the nylon has been heat-modified so that its elastic memory is effectively confined to a period subsequent to knot formation, so that the knots are set to retain substantially the form and relationship to the twine they were given when knotted. The netting is characterized by the absence of "slip-mesh" and retains the form when in spread-out condition as shown in Figure 2.

"Slip-mesh," as will occur in ordinary nylon netting is shown in Figure 5. An ordinary nylon netting which has been in use and has undergone "slip-mesh" is shown in Figure 4. Contrast the advantage of netting according to the invention as shown in Figures 2 and 3 with that of prior art netting as shown in Figures 4 and 5.

The invention is applicable to netting made from twines of various sizes, for example, 140 denier/3, 210/3 and higher plied multiples of 210 denier.

We claim:
1. Fish netting, comprising, uncoated nylon twine knotted with tight single weaver's knots, the nylon having a heat-modified elastic memory effectively confined to a period subsequent to knot formation, the knots being substantially evenly spaced apart and intervened by precise lengths of twine and the knots being set to retain substantially the form and relationship to the twine they were given when knotted.

2. A method of making fish netting from nylon twine comprising, continuously performing simultaneously on successive lengths of nylon twine a knotting step to form the netting, and a setting step to subdue the elastic memory of the nylon, the knotting step being performed on a portion of a length while the setting step is being performed on a previously knotted portion of the length and the entire length is kept constantly under tension from the time of knotting until set, the setting step comprising passing the netting continuously through a bath of water at a temperature of from about 125° F. to about 200° F. and then through a dry heating zone at a temperature of from about 200° F. to about 300° F. at the normal knotting speed, whereby there is produced a netting in which the knots are tight and the elastic memory of the nylon is effectively confined to a period subsequent to knot formation.

ROLAND JOHNSON.
ROBERT W. KOLB.

References Cited in the file of this patent

UNITED STATES PATENTS

| Number | Name | Date |
| --- | --- | --- |
| 2,157,118 | Heckert | May 9, 1939 |
| 2,157,119 | Miles | May 9, 1939 |
| 2,162,115 | Pauls | June 13, 1939 |
| 2,191,556 | Carothers | Feb. 27, 1940 |
| 2,238,098 | Bradshaw | Apr. 15, 1941 |
| 2,252,554 | Carothers | Aug. 12, 1941 |
| 2,297,729 | Thomas | Oct. 6, 1942 |
| 2,365,931 | Benger | Dec. 26, 1944 |
| 2,501,213 | Cutler | Mar. 21, 1950 |
| 2,536,312 | Saether | Jan. 2, 1951 |
| 2,590,586 | Thompson, Jr. | Mar. 25, 1952 |

OTHER REFERENCES

"Industrial and Engineering Chemistry," December 1940, vol. 32, No. 12, pages 1560–1564 inclusive.